Dec. 29, 1931.  B. H. STEVENS  1,838,877
CHILD'S SCOOTER AND COASTER
Filed Dec. 4, 1930   2 Sheets-Sheet 1
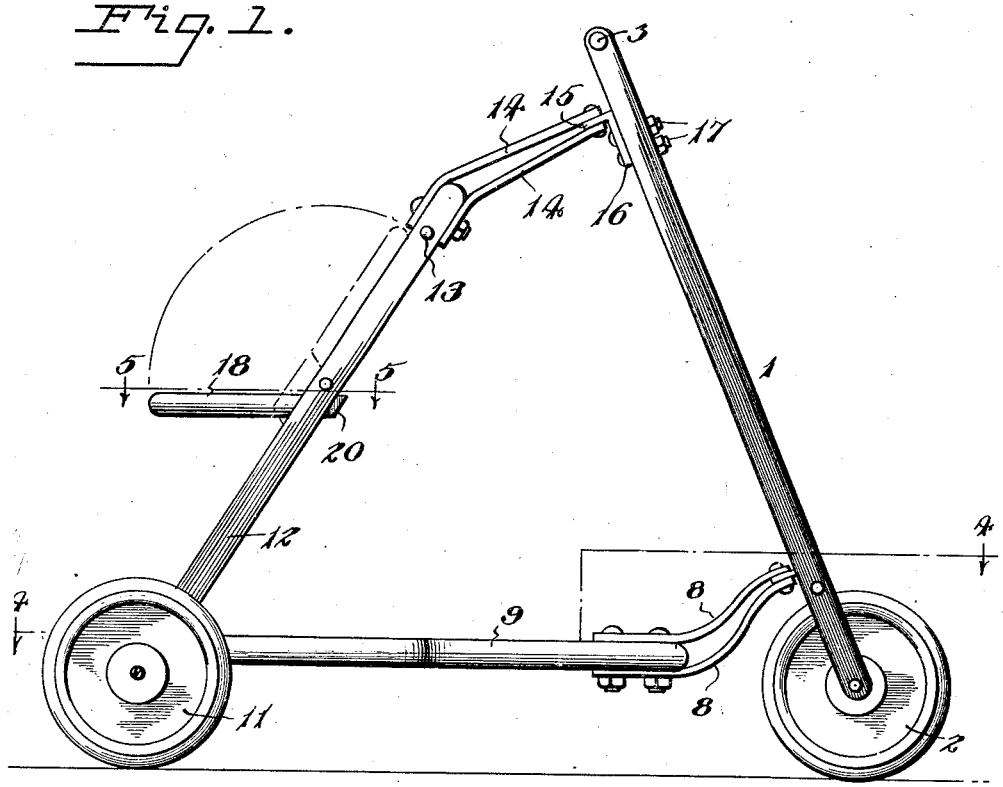
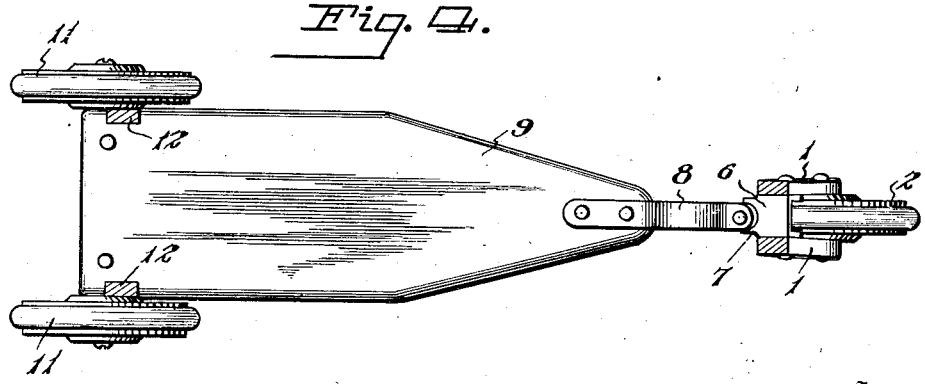
Inventor
B. H. Stevens
By Lacey & Lacey, Attorneys Dec. 29, 1931.  B. H. STEVENS  1,838,877
CHILD'S SCOOTER AND COASTER
Filed Dec. 4, 1930   2 Sheets-Sheet 2
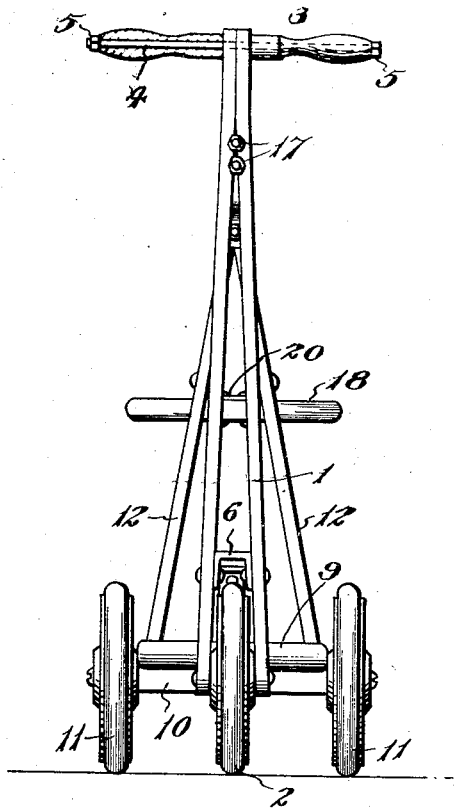
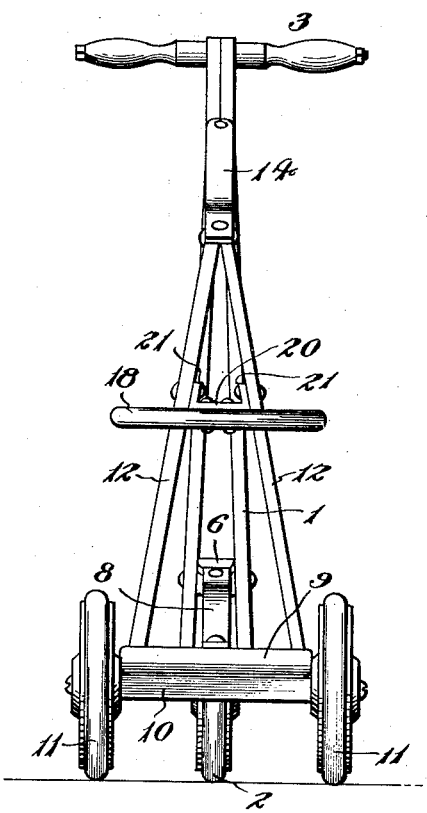
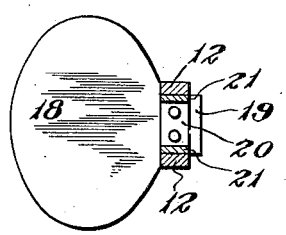
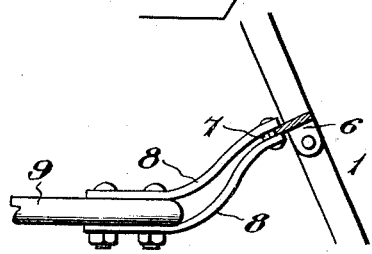
Inventor
B. H. Stevens
By Lacey & Lacey,
Attorneys Patented Dec. 29, 1931

1,838,877

UNITED STATES PATENT OFFICE

BENJAMIN H. STEVENS, OF NEW BRITAIN, PENNSYLVANIA

CHILD'S SCOOTER AND COASTER

Application filed December 4, 1930. Serial No. 500,079.

This invention relates to child's toy vehicles and its primary object is to provide a vehicle which may be used as a coaster or as a scooter, as the user desires. Another object of the invention is to provide means whereby a child using the vehicle may be seated thereon for coasting and will be provided with a firm comfortable rest when the vehicle is used as a scooter. The invention also seeks to provide a vehicle of the stated type which will be inexpensive but strong and durable. These stated objects and other objects which will incidentally appear in the course of the following description are attained in such a device as is illustrated in the accompanying drawings and the invention resides in certain novel features which will be hereinafter more fully described and then more particularly pointed out in the appended claims.

In the drawings:

Figure 1 is a side elevation of a vehicle embodying the present invention,

Fig. 2 is a front elevation of the same,

Fig. 3 is a rear elevation thereof,

Fig. 4 is a horizontal section on the line 4—4 of Fig. 1,

Fig. 5 is a section on the line 5—5 of Fig. 1, and

Fig. 6 is a detail sectional elevation more particularly showing the pivotal connection between the platform and the front steering fork.

In carrying out the present invention, there is provided a front fork 1 consisting of two suitably shaped and proportioned wooden strips which are disposed to converge toward their upper ends. Between the lower ends of these strips is mounted a ground wheel 2 which will preferably be provided with a rubber tire and may be of this construction or of other popular desired form. At the upper end of the front fork 1 is provided a steering bar or handle 3 which, as shown in Fig. 2, is preferably formed of two turned wooden sleeves and a fastening rod 4 inserted through said sleeves and the upper end of the fork and equipped at their ends with nuts 5 whereby, when the nuts are turned home, the wooden sleeves will be clamped against opposite sides of the fork and the upper ends of the fork members clamped together. Disposed between the members of the fork and rigidly secured thereto at a point slightly above the steering wheel 2 is a bracket 6 having suitable downturned lugs through which fastening bolts may be inserted to secure the same to the members of the fork and having a rearwardly projecting edge portion 7 to which are pivotally attached the front ends of upper and lower metallic straps 8 which extend rearwardly in slightly downwardly diverging relation to be rigidly secured at their rear ends to the top and bottom of the platform 9 at the front end of the same. The platform, as will be understood upon reference to Figs. 1 and 4 more particularly, is a stout board, smoothly finished and tapered at its front end but of substantial width in its rear portion. A wooden axle 10 is bolted firmly to the under side of the platform at the rear end of the same and upon the ends of this axle are mounted the rear wheels 11, which will preferably be identical with the front wheel 2 in construction and design. At its rear end the platform 9 is provided with notches in its opposite side edges and these notches are fitted and secured to the lower ends of the rear fork members 12 which extend upwardly and also extend forwardly toward the front fork 1 which, as shown in Fig. 1, is inclined rearwardly. The upper ends of the fork members 12 meet and are secured together by a bolt 13 inserted transversely therethrough, and secured to the front and rear sides of the meeting ends of these fork members are straps 14 which extend forwardly in converging relation and are pivotally connected at their front ends to the rear extending portion 15 of a bracket 16 fitted against the meeting upper ends of the front fork members and rigidly secured thereto by bolts 17 passing through the members, as will be understood.

At an intermediate point in the height of the rear fork members 12 is provided a seat 18 which is preferably formed of a suitably shaped board and is pivotally mounted upon the fork so that it may be disposed in the position shown in Fig. 1 in full lines for use as a seat when the child is coasting, or may be swung up to the position shown by dotted lines to rest against the fork and furnish a comfortable support or rest for the body of the child when the vehicle is being used as a scooter. At the center of its front edge the seat is formed with a forwardly projecting tongue 19 which extends between the fork members, as will be understood upon reference to Fig. 5, and this tongue bears against and is secured to the under side of a bracket 20 which is disposed between the fork members 12 and has upstanding end lugs 21 pivotally secured upon the inner sides of the respective fork members. At the opposite sides of the tongue 20 the front edge of the seat is suitably beveled so that it will bear firmly against the rear fork members 12 and will be supported thereby and have its downward movement limited thereby. When it is swung upwardly to the dotted line position, the seat will rest upon the rear fork members 12 above its pivot and may then be utilized by the child as a body rest and brace.

From the foregoing description taken in connection with the accompanying drawings, it will be seen that I have provided a very simple and inexpensive toy vehicle which may be easily used by the child as a scooter or as a coaster. Whether coasting or scooting, the child can easily reach the steering bar or handle so as to control the vehicle. When used as a scooter, one foot will be placed upon the platform 9 and the other foot used to propel the vehicle by pushing or kicking against the ground at the rear of the vehicle. When used as a coaster, the child will sit upon the seat 18 and both feet may be placed upon the platform, as will be understood. The form of the device provides a substantial base portion and the pivotal connections of the front fork with the rear fork and the platform permit the device to be easily steered.

Having thus described the invention, I claim:

1. A child's vehicle comprising a front fork, a rear fork, the forks converging forwardly and being pivotally connected adjacent their upper ends, a platform rigidly connected with the rear fork and pivotally connected with the front fork, ground engaging wheels carried by the lower ends of the forks, and a seat hinged to the rear fork to extend rearwardly therefrom or fold upwardly against the same to be supported thereby.

2. A child's vehicle comprising a front fork, a rear fork, the forks converging forwardly and being connected pivotally adjacent their upper ends, a platform rigidly secured to the rear fork and pivotally connected with the front fork, ground engaging wheels at the lower ends of the forks, a seat having its front edge adapted to bear against the rear fork and provided with a tongue extending through the rear fork, and a bracket rigidly secured on the upper side of said tongue and pivotally secured to the rear fork between the sides of the same whereby the seat may be swung upwardly to rest against the rear fork above the pivotal connection therewith.

3. A toy vehicle comprising a front fork, brackets secured to said fork and having a portion projecting rearwardly beyond the same, a platform, a rear fork secured to the platform and converging toward the front fork from the platform, wheels carried by the lower ends of the forks, straps secured rigidly to the top and bottom of the platform at the front end of the same and having their front ends pivotally attached to the rear projecting portion of one of said brackets, and other straps secured to the front and rear sides of the rear fork at the upper end of the same and pivotally attached at their front ends to the upper bracket on the front fork.

In testimony whereof I affix my signature.

BENJAMIN H. STEVENS.